(No Model.)
W. J. BUSSE.
BALL BEARING FOR CYCLES, &c.
No. 567,732. Patented Sept. 15, 1896.
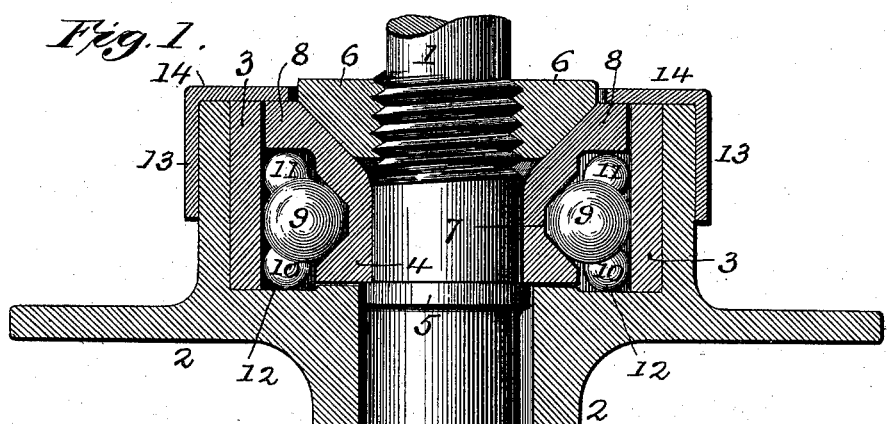
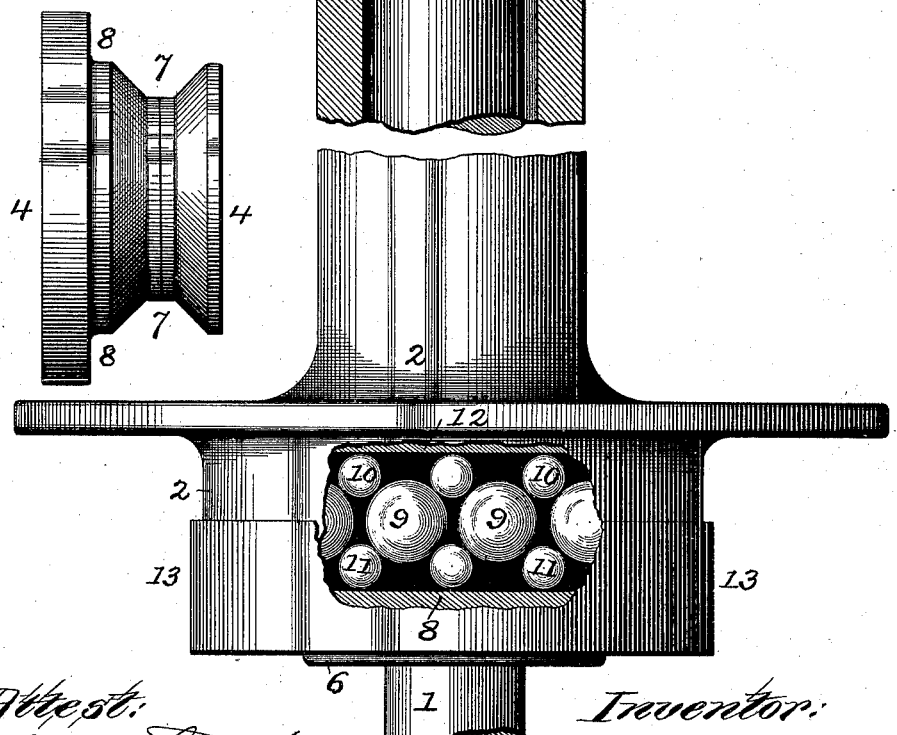

UNITED STATES PATENT OFFICE.

WILLIAM J. BUSSE, OF CHICAGO, ILLINOIS, ASSIGNOR OF ONE-HALF TO PETER F. QUINN, OF SAME PLACE.

BALL-BEARING FOR CYCLES, &c.

SPECIFICATION forming part of Letters Patent No. 567,732, dated September 15, 1896.

Application filed September 3, 1895. Serial No. 561,327. (No model.)

*To all whom it may concern:*

Be it known that I, WILLIAM J. BUSSE, a citizen of the United States, residing at Chicago, in the county of Cook and State of Illinois, having invented a certain new and useful Improvement in Ball-Bearings for Cycles, &c.; and I do hereby declare the following to be a full, clear, and exact description of the same, reference being had to the accompanying drawings, forming a part of this specification.

This invention relates to that type of axle-bearings in which a series of balls are interposed between the axle and hub to form a rolling antifriction-bearing between the two; and the object of the present invention is to provide a simple and efficient construction of such bearings in which a sliding of one ball upon another, as well as upon the bearing surfaces, is entirely prevented and at the same time a substantial bearing of the different balls is provided that will resist in a very perfect manner the end-thrust of the axle in use. I attain such object by the construction and arrangement of parts illustrated in the accompanying drawings, in which—

Figure 1 is an enlarged elevation of a bicycle axle and hub, with parts in sections, and with other portions broken away, illustrating my present invention; and Fig. 2, a side elevation of the inner bearing-collar of the bearing in a modified form from that shown in Fig. 1.

Similar figures of reference indicate like parts in both views.

Referring to the drawings, 1 represents the axle, and 2 the hub or shell, provided at each end with the usual enlarged cavities, in which are arranged the annular lining or bearing sleeves 3, of steel or like hardened metal, and which constitute an internal circular track for the movement of the bearing-balls.

4 is the bearing collar of the axle, having a central bore to fit that axle, which axle is formed with a stop-shoulder 5, against which such collar abuts when in position.

6 is a nut screwing upon the axle, and adapted to hold the bearing-collars 4 in proper position. The bearing-collar is formed with a circumferential groove 7 and with a circular outer rim 8, that constitute circular tracks for the balls of the bearing, the rim 8 being of a diameter about equal to the internal diameter of the lining-sleeve 3, so as to constitute a closure for the outer end of the hub-cavity. The bearing-collar 4 may be made of a single piece of metal, as shown in Fig. 1, or in sections, as shown in Fig. 2, without departing from the spirit of my present invention.

9 are the main bearing-balls, a series of which are arranged in the circumferential groove 7 and between the same and the inner surface of the bearing-sleeve 3, as shown.

10 and 11 are counterpart series of intermediate or auxiliary balls, smaller in size than the main balls 9, and arranged at each side and between the series of main balls 9, as shown, so as to hold such main balls 9 in separated relation. Such series of intermediate balls 10 and 11 have bearing against the main balls 9, the inner surface of the bearing-sleeve 3, the vertical wall 12 of the hub, and the outer rim 8 of the bearing-collar 7, respectively.

13 is a cap adapted to fit upon the ends of the hub or shell 2, the head 14 of which is formed with a central orifice for the movement of the nut 6, such head 14 fitting against the outer surface of the bearing-collar 4 to constitute a dust-proof joint between such collar and the hub to prevent entrance of dust, &c., to the ball-bearing proper.

Having thus fully described my said invention, what I claim as new, and desire to secure by Letters Patent, is—

1. A ball-bearing for axles, comprising in combination, a hub 1, having an enlarged bearing-cavity for the balls, an axle, a bearing-collar as 4, a series of main balls 9, and two series of auxiliary balls 10 and 11, arranged at the sides and between the main series of balls 9, and having bearing against the main balls, and the concentric inner surface and the end surfaces of the ball-bearing cavity, substantially as set forth.

2. A ball-bearing for axles, comprising in combination, a hub 1, having an enlarged bearing-cavity for the balls, an axle, a bearing-collar 4, formed with a circumferential groove 7, a series of main balls 9, and two series of auxiliary balls 10 and 11, arranged at the sides and between the main series of balls, and having bearing against the main balls, and the concentric inner surface, and the end surfaces of the ball-bearing cavity, substantially as set forth.

3. A ball-bearing for axles, comprising in combination, a hub 1, having an enlarged bearing-cavity for the balls, an axle, a bearing-collar 4, formed with a circumferential groove 7, and circular rim 8, a series of main balls 9, and two series of auxiliary balls 10 and 11, arranged at the sides and between the main series of balls, and having bearing against the main balls, and the concentric inner surface and the end surfaces of the ball-bearing cavity, substantially as set forth.

In testimony whereof witness my hand this 26th day of August, 1895.

WILLIAM J. BUSSE.

In presence of—
 ROBERT BURNS,
 GEO. H. ARTHUR.